United States Patent
Ryu

(10) Patent No.: US 9,208,695 B2
(45) Date of Patent: Dec. 8, 2015

(54) LANGUAGE STUDY SYSTEM AND METHOD EMPLOYING MULTIFACETED BLOCK DEVICE REPRESENTATION SYSTEM

(71) Applicant: Board of Trustees of Michigan State University, East Lansing, MI (US)

(72) Inventor: Catherine Youngkyung Ryu, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 158 days.

(21) Appl. No.: 13/793,211

(22) Filed: Mar. 11, 2013

(65) Prior Publication Data

US 2014/0255885 A1 Sep. 11, 2014

(51) Int. Cl.
G09B 19/06 (2006.01)
G09B 19/08 (2006.01)

(52) U.S. Cl.
CPC ............... G09B 19/08 (2013.01); G09B 19/06 (2013.01)

(58) Field of Classification Search
CPC ................................ G09B 19/08; G09B 19/06
See application file for complete search history.

(56) References Cited

U.S. PATENT DOCUMENTS

| | | | | |
|---|---|---|---|---|
| 550,563 A * | 11/1895 | Pierce, Jr. | ...................... | 434/403 |
| 557,307 A * | 3/1896 | Foster | ........................... | 434/172 |
| 1,286,631 A * | 12/1918 | Hillyard | ........................ | 434/170 |
| 3,670,427 A * | 6/1972 | Stolpen | ......................... | 434/157 |
| 3,750,307 A * | 8/1973 | Phillips et al. | ................. | 434/174 |
| 3,873,093 A * | 3/1975 | Beskrone | ....................... | 273/272 |
| 4,245,587 A * | 1/1981 | Cooper et al. | ................. | 119/712 |
| 4,586,160 A * | 4/1986 | Amano et al. | ...................... | 704/8 |
| 4,768,959 A * | 9/1988 | Sprague et al. | ............... | 434/156 |
| 5,013,245 A * | 5/1991 | Benedict | ........................ | 434/170 |
| 5,190,285 A * | 3/1993 | Levy et al. | ...................... | 463/36 |
| 5,275,567 A * | 1/1994 | Whitfield | ........................ | 434/113 |
| 5,823,782 A * | 10/1998 | Marcus et al. | ................. | 434/156 |
| 5,991,693 A * | 11/1999 | Zalewski | ....................... | 701/300 |
| 6,318,725 B1 * | 11/2001 | Saint-Victor | .................. | 273/447 |
| 6,464,503 B1 * | 10/2002 | Heit et al. | ....................... | 434/156 |
| 6,755,655 B2 * | 6/2004 | Marcus et al. | ................. | 434/156 |
| 7,011,525 B2 * | 3/2006 | Mejia | ............................. | 434/167 |
| D590,442 S * | 4/2009 | Jones | ............................. | D19/59 |
| 7,832,728 B2 * | 11/2010 | Perry | ............................. | 273/146 |
| 2006/0286514 A1 * | 12/2006 | Gross | ............................. | 434/156 |

OTHER PUBLICATIONS

"Chunks", http://www.didax.com; Published prior to Mar. 11, 2012; 3 pages.

(Continued)

*Primary Examiner* — Robert J Utama
(74) *Attorney, Agent, or Firm* — Harness, Dickey & Pierce, P.L.C.

(57) ABSTRACT

A composition in the target language is parsed into plural different linguistic components, including sound level, grammar level and at least one functional grammar level component. The linguistic components are then expressed on different facets of an n-sided block device representation system according to predefined sets of rules. The facets of the block device may then be selectively examined by the learner to visualize how the target language functions to express the composition with respect to the way sounds, grammar and functional grammar are used. The block device representation system may be computer-implemented, rendering the facets on display panels associated with physical blocks, or as computer-generated images upon a display device.

18 Claims, 18 Drawing Sheets

(56) References Cited

OTHER PUBLICATIONS

"Clusters—Word-Building Game", http://www.didax.com; Published prior to Mar. 11, 2012; 3 pages.
"Compound Word Dominoes", http://www.didax.com; Published prior to Mar. 11, 2012; 3 pages.
"Go to Press!—A Grammar and Proofreading Game", http://www.eaieducation.com; Published prior to Mar. 11, 2012; 4 pages.
"Magnetic QuietShape® 3" Write-On/Wipe-Off Dice", http://www.eaieducation.com; Published prior to Mar. 11, 2012; 4 pages.
"Magnetic Sentence Strips", http://www.eaieducation.com; Published prior to Mar. 11, 2012; 4 pages.
"Sifteo Cubes", https://sifteo.com; Published prior to Mar. 11, 2012; 3 pages.
"Writing Directories: Poetry Writing Directory", http://www.didax.com; Published prior to Mar. 11, 2012; 3 pages.
"Mathlink Cubes", http://www.learningresources,corn: Published prior to Mar. 11, 2012; 2 pages.
"Unifix Blends Cubes", http://www.didax.com; Published prior to Mar. 11, 2012; 3 pages.

* cited by examiner

|  | a<br>○ | i<br>○○ | u<br>○○○ | e<br>○○○○ | o<br>○○○○○ |
|---|---|---|---|---|---|
|  | あ | い | う | え | お |
| •<br>k | か | き | く | け | こ |
| • •<br>s | さ | し | す | せ | そ |
| • • •<br>t | た | ち | つ | て | と |
| • • •<br>• •<br>n | な | に←10 | ぬ | ね | の |
| • • •<br>• • •<br>h | は | ひ | ふ | へ | ほ |
| • • •<br>• • •<br>• •<br>m | ま | み | む | め | も |
| • • • •<br>• • • •<br>y | や | い | ゆ | え | よ |
| • • • •<br>• • • •<br>• •<br>r | ら | り | る | れ | ろ |
| • • • • •<br>• • • • •<br>w | わ | ゐ | う | ゑ | を |

Fig. 2a

|  | a<br>○ | i<br>∞ | u<br>∞∞ | e<br>∞∞∞ | o<br>∞∞∞∞ |
|---|---|---|---|---|---|
| ◐<br>g | が | ぎ | ぐ | げ | ご |
| ◐　◐<br>z | ざ | じ | ず | ぜ | ぞ |
| ◐　◐　◐<br>d | だ | ぢ | づ | で | ど |
| ◐　◐　◐<br>b<br>◐　　　◐ | ば | び | ぶ | べ | ぼ |
| ○　○　○<br>p<br>○　　　○ | ぱ | ぴ | ぷ | ぺ | ぽ |
| ●○<br>"n" | ん |  |  |  |  |

Fig. 2b nouns pronouns

| Kami 1 ® | Sa *i* | Kami 2 ® |
|---|---|---|
| Ka *i* | Fourth-grade ® | Ra *i* |
| Shimo 1 ® | Na *i* | Shimo 2 ® | verbs

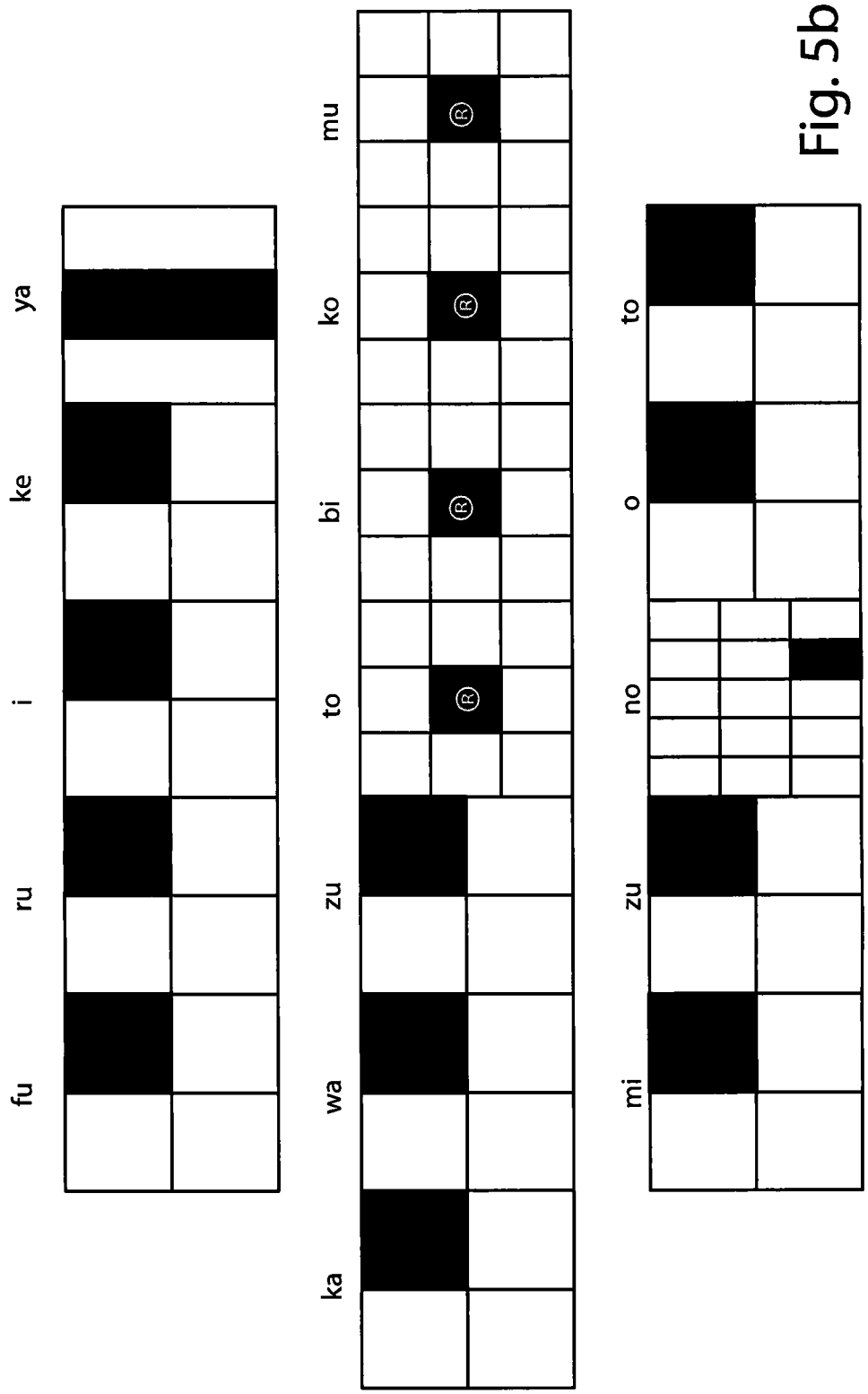

US 9,208,695 B2

LANGUAGE STUDY SYSTEM AND METHOD EMPLOYING MULTIFACETED BLOCK DEVICE REPRESENTATION SYSTEM

FIELD OF THE DISCLOSURE

The present disclosure relates generally to educational systems for language and literature studies. More particularly the disclosure relates to a system and method for teaching and learning a language and for studying the literature and culture supported by that language, employing specially configured, multifaceted blocks, which may have computer-implemented components.

BACKGROUND

A child learns her native language from her mother and father, and through immersion in her native culture. This learning occurs during a formative time when her developing brain is highly receptive to acquiring the language. No one remembers learning his or her first language. It just happens.

Learning a second language is typically more difficult, however, particularly if the learner is beyond the formative years and has limited opportunity for total immersion in the new language and culture. Thus conventional language training involves teachers, classrooms, textbooks and audio/video aids, designed to teach the student the separate skills of reading, writing, speaking and listening in the target language. As the student becomes more advanced, these skills may be enhanced through study of the literature of the target language.

Students wishing to acquire communication skills in a modern language will typically concentrate on learning the patterns of conversational dialogue and then augment those studies by reading contemporary literature. However, some students may choose to explore the classical or ancient literature, and in such studies the language may differ significantly from the contemporary. Study of classical or ancient languages poses the challenge that there is little, if any, opportunity to hear the language being spoken. Nevertheless, study of the classical or ancient language is important. It offers a window into the culture of the past and gives the student a better understanding of how the contemporary language evolved.

Thus some educators believe that exposure to the classical or ancient literature can even benefit students whose primary interest is the contemporary language. In the study of English, for example, native English speaking students are introduced during high school to the Middle English texts of Chaucer (1343-1400) or to even earlier Old English texts such as Beowulf (8th-11th century). Similarly, students of contemporary Japanese may be exposed to classical Japanese texts, such as the haiku poetry of Matsuo Basho (1644-1694).

The study of a language and the literature and culture supported by that language can be a complex undertaking, for there are many aspects to a language. The spoken language comprises a system of sounds or phonology. The written language comprises a system of characters or symbols that combine according to a spelling system or orthography. The spoken and written branches of the language share a set of grammar rules that encompass many often complex aspects including syntax and morphology (including inflections) and sometimes also phonology, dialect and semantics.

SUMMARY

The systems and methods disclosed here are designed to expose some of the most important aspects of a language, giving the teacher and student a framework with which to explore the language and its supported literature and culture. The framework subdivides and exposes the language as different linguistic component levels, including a sound level, a grammar level and one or more functional grammar levels. The systems and methods express these different levels as different facets or sides of a block device representation system that allows the student to visualize and touch the different levels of the language in a unique way that amplifies the learning process. These systems and methods are suitable for formal teacher-student classroom studies, and are also suitable for self-study and for group study via interactive mechanisms such as on-line language study games.

In one embodiment a set of multifaceted block devices express the different linguistic component levels of the language. The blocks may be physically arranged to express a literary composition, with the blocks having interactive interface components that enforce linking rules. The linking rules enforce the orthography and grammar of the language, allowing permitted combinations of language components to be assembled to form words and sentences; but disallowing non-grammatical combinations.

When assembled according to a given literary content, the blocks display on their respective facets different levels of the language. The student can rotate the composition-assembled blocks as a group, so that different facets can be focused on for study. The student can, for example, orient the composition-assembled blocks so that the sound facet is upwardly exposed. In such orientation the student can see how the sounds flow for the given composition. Rotating the blocks, as a group, so that the grammar facets are upwardly exposed, the student can then see which parts of speech were selected by the author of the given composition. Rotating the blocks again reveals a functional grammar level, where the student can then see how the parts of speech function: which words modify other words, how phrases are connected, and so forth.

In another embodiment the block devices may include computer-generated components. The blocks are constructed having electronic display surfaces on each of their sides, which are coupled to a microprocessor or microcontroller disposed within each block. Proximity sensors associated with each of the blocks sense which blocks each are adjacent to, and the microprocessors or microcontrollers of each block use this sensed information to determine how the blocks are arranged (e.g., according to a given composition).

The microprocessors or microcontrollers are in wireless communication with one another and are programmed to mutually enforce the interface linking rules. If desired the blocks may include accelerometer and gyroscopic sensors to detect when and how the blocks have been rotated via manual manipulation. The microprocessors or microcontrollers generate the displays, shown on the respective display surfaces, based on the composition into which the blocks are arranged and based on which facet the user has selected to be upwardly facing. The respective blocks can be configured to communicate peer-to-peer, generating the respective displays by intra-processor negotiation. Alternatively, the blocks can be configured to communicate to a central computer that mediates the respective block displays.

In yet another embodiment the block devices may be computer-generated images, graphically displayed on the display screen of a computer monitor or on the display of an iPad®, tablet computer or smartphone.

The multifaceted block devices can have any number of sides or facets, each corresponding to a different linguistic component level. In a physical block embodiment, the blocks may comprise six-sided cubes, as being a convenient form factor for manipulation by hand. While a six-sided cube is convenient, devices having other numbers of facets are also possible.

BRIEF DESCRIPTION OF THE DRAWINGS

FIGS. 2a and 2b comprise a chart showing how sounds of Japanese language may be visually portrayed to construct sound level representations;

FIG. 5a is a chart showing how nominals and verbals can be visually portrayed to construct a functional grammar level representation higher than the one described in FIG. 4a.

FIG. 5b is a plan view of the plurality of blocks of FIG. 1, using the visual representations from the chart of FIG. 5a to portray a functional grammar level representation of Basho's Frog Haiku (block facet or side 4);

FIG. 6a [side 5] is a chart showing how nominals and verbals can be visually portrayed to construct a functional grammar level representation higher than or different than the one described in FIG. 5a;

DESCRIPTION OF THE PREFERRED EMBODIMENTS

To illustrate the system and method of teaching a language, the classical Japanese language will be used. It will, of course, be understood that the techniques used here are suitable for other languages as well. In the present example, a literary composition will be featured, specifically a Japanese haiku. It will be understood, however, that the techniques disclosed here are equally applicable to other literary forms. The haiku has been chosen for this example because it represents a relatively simple formal structure, yet rich in literary nuances.

Figure 1:
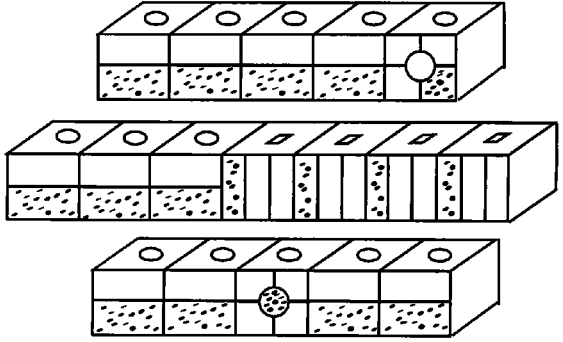
FIG. 1 is a perspective view of a plurality of blocks in accordance with the disclosed system and method, the blocks being arranged according to a predefined literary content, namely Basho's Frog Haiku (with sides 2 and 3 visible in this view)

For illustration purposes, an exemplary classical Japanese haiku has been featured in FIG. 1. The particular haiku chosen for illustration is by Matsuo Basho (1644-1694), sometimes referred to Basho's Frog Haiku. Basho would have written his famous haiku using brush and ink to draw the individual kanji characters shown in FIG. 1. The Kanji characters were introduced to Japan, perhaps as early as 57 A.D., with a wider adoption in perhaps the $5^{th}$ century A.D. The term "kanji" literally means "Chinese characters". The Chinese characters are capable of conveying both meaning and sound. While the Chinese people and Japanese people would have spoken different languages in the $5^{th}$ century A.D., the meanings of things and actions found in everyday life would certainly have been common to both peoples. Thus, the Chinese characters were readily adopted by the Japanese people to represent the nouns, verbs, adjectives and adverbs in their language, even though those characters would likely have been pronounced differently by the Chinese people.

Because kanji characters carry both sound and meaning, and are often quite complex to draw, the Japanese felt the need for a more simplified system with which to represent the sounds of their language. Thus, the Japanese developed a complementary writing system known as kana that could be used to represents the sounds of their language, apart from the meaning conveyed by the kanji character equivalents. Today, that kana system is still used in Japan, together with the kanji system, although both systems have evolved somewhat from their ancient representations.

FIG. 1 illustrates how the Basho Frog Haiku would be represented using the historical kana symbols. Essentially, the symbols show how one would pronounce the haiku expressed by the kanji characters above. These historical kana characters would be largely understandable and pronounceable by a native Japanese speaker today. However, because the kana symbols are not used in the English language, a Romanized kana representation has also been provided in FIG. 1. Referring to the Romanized kana representation, one can see that the Basho Frog Haiku comprises seventeen syllables, broken down into lines of 5, 7 and 5 syllables, respectively.

When the 17 syllables of the Basho Frog Haiku are spoken aloud, the native speaker would perceive meaning and would thus parse the sounds according to words and other grammatical constructs within the language. For example, the sounds represented by Romanized kana "fu-ru," correspond to the meaning "old". The sounds "i-ke" correspond to the word "pond", and so forth. While it is possible to convert these parsed sounds into a literal translation, based on the meanings of the corresponding kanji characters, such a translation would not be particularly pleasing to the native English speaker. Thus, when English translations are prepared, often certain liberties are taken to express the English meaning in a poetic way. To illustrate this, FIG. 1 provides two different English meaning translations, translation A having been prepared by the American poet Alan Ginsburg and translation B having been prepared by Greek-born international writer, Lafcadio Hearn, who also wrote under the pen name Koizumi Yakumo.

FIG. 1 shows how the Basho Frog Haiku may be represented using a block device representation system of the present disclosure. The block device system uses multifaceted n-sided blocks onto which specific graphical symbols are applied for language study purposes as will be more fully described herein. It should be appreciated that the block device representation system may be implemented using graphical symbols of different colors, and such is a preferred embodiment. However, because the United States patent system currently favors black and white drawings, colored renditions of the block device representation system have not been provided; but it is assumed that one of skill in the art would understand how to implement colored renditions of the block device representation system.

Block Side 1—Sounds

As stated above, the method and apparatus for teaching a language according to the present disclosure can be utilized with any language. Thus, classical Japanese is used here as an example. FIGS. 2a and 2b comprise a chart showing how the sounds of the Japanese language may be visually portrayed to construct sound level representations of literary compositions, or even of randomly assembled sounds selected from the sound palate available in the language. The classical Japanese language comprises 50 basic sounds that can be organized according to the two-dimensional table shown in FIGS. 2a and 2b. Although each of the 50 sounds is considered to be a unique and singular utterance in the Japanese language, one can analyze these sounds using the vowel and consonant sounds found in the English language. Thus, the table in FIGS. 2a and 2b organizes the 50 sounds by the dominant vowel component (columns) and the dominant consonant component (rows). It will be understood, however, that the correspondence between Japanese sounds and English sounds is an approximation. For example, the English consonants "l" and "r" are largely indistinguishable from one another to the native Japanese ear and map to a Japanese sound that, to the English ear, lies somewhere between "l" and "r". There are other sound differences between Japanese and English as well.

To use the table of FIGS. 2a and 2b, one identifies a character by finding the row and column to which that character is assigned. For example, the character shown at 10 lies on the n-consonant row and the i-vowel column. Thus, the sound of this character when approximated using English sounds, is "ni" (rhymes with "knee").

In accordance with the graphical system of the present disclosure, the consonant rows and vowel columns each have an assigned graphical symbol as illustrated in the table of FIGS. 2a and 2b. In a preferred embodiment, these graphical symbols would be in color, however, as stated above, black and white renditions are used here to accommodate the U.S. Patent Office printing system, and black and white embodiments of the disclosed system are certainly possible within the scope of this disclosure.

Figure 2C:
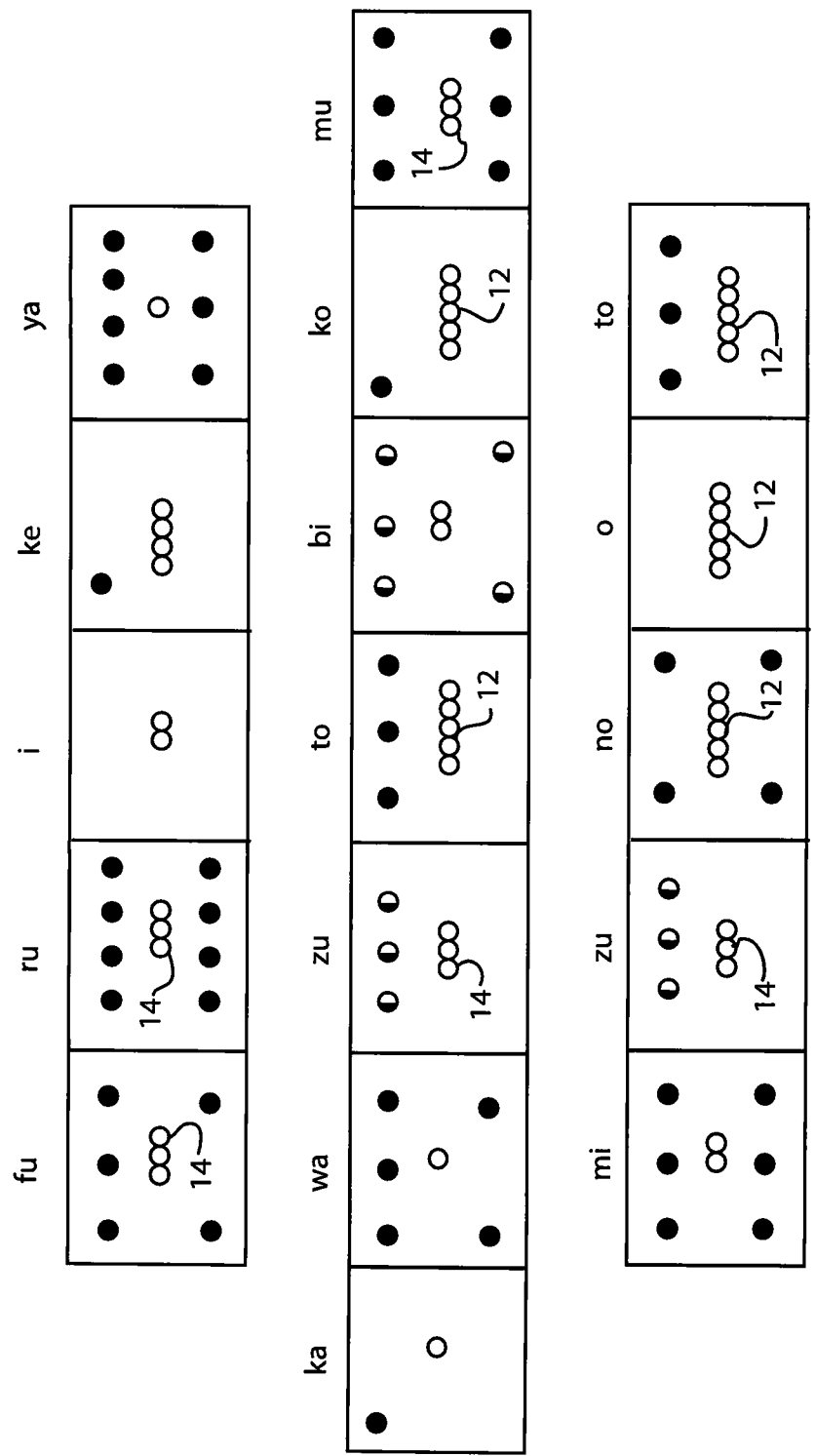
FIG. 2c is a plan view of the plurality of blocks of FIG. 1, using the visual representations from the chart of FIGS. 2a and 2b to portray a sound level representation of Basho's Frog Haiku (block facet or side 1)

FIG. 2c uses the graphical symbols of FIGS. 2a and 2b to illustrate how the Basho Frog Haiku would be depicted using the block device representation system of the present disclosure. From the depiction in FIG. 2c, the language student can see sound patterns within the haiku poem and thus begin to understand how the classical Japanese language uses sounds to paint an impression or convey emotion. In the Basho Frog Haiku poem one can see, for example, the "o" vowel sound is used in five of the seventeen syllables, as depicted at 12. The "u" vowel is used in five of the seventeen syllables as depicted at 14. By studying FIG. 2c, we can see that the "u" vowel occurs with greater frequency at the beginning of the poem, that there is tension between the "u" vowel and the "o" vowel in the middle of the poem, and that the "o" vowel dominates at the end of the poem. While the significance of this interplay of sounds may not be apparent to a casual reader, students of the language are able to compare the interplay and flow of sounds by utilizing the block device representation system to compare different literary works and thus gain an appreciation of how sounds may be used in the language to support poetic content.

Block Side 2—Grammar

Figure 3A:
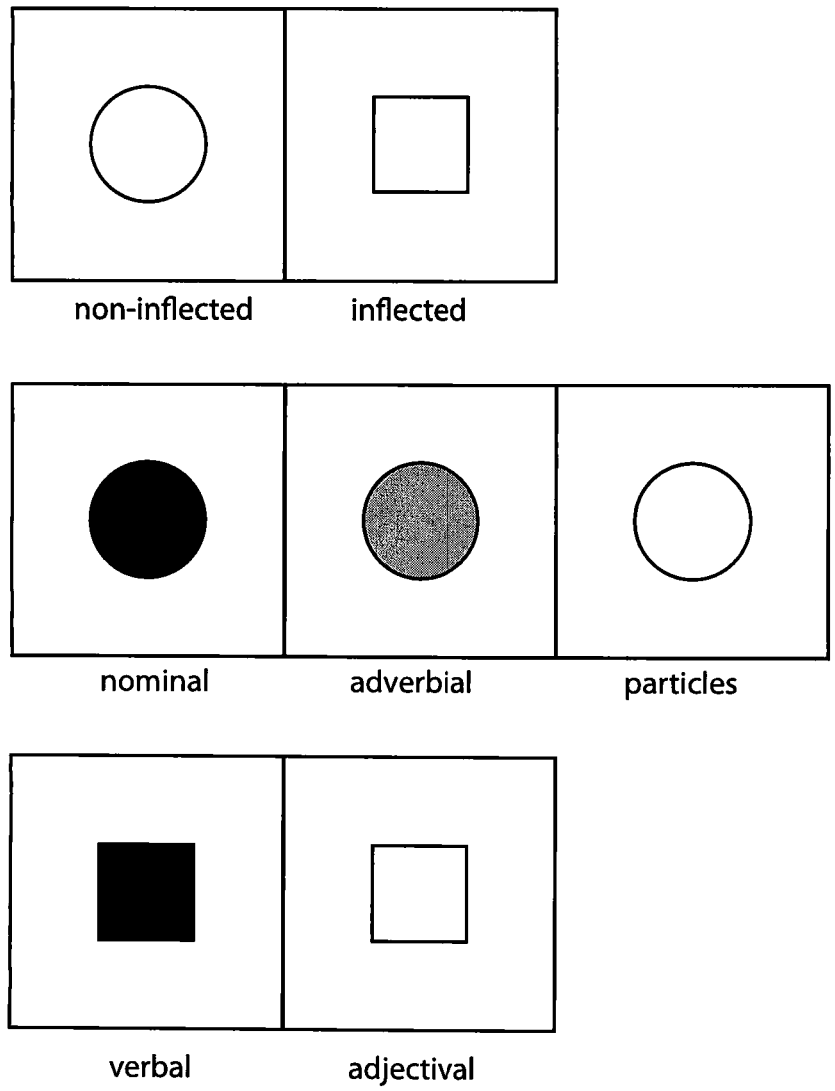
FIG. 3a is a chart showing how syllables of Japanese language may be visually portrayed to construct grammar level representations.

Referring next to FIG. 3a, there is presented a chart showing how groups of sounds or words of the Japanese language may be visually portrayed to construct grammar level representations. More specifically, these grammar level representations may correspond to different "parts of speech". In this case, classical Japanese has both non-inflected and inflected words. Inflection involves modifying the word to express different grammatical categories such as tense, grammatical mood, grammatical voice and aspect. Although not used in classical Japanese, other languages may include other grammatical categories, such as person, number, gender and case. The block device representation system uses a circle to represent non-inflected words and a square to represent inflected words. Nominal words (nouns) are assigned the color green, adverbial words the color yellow and particles the color red. Particles are a grammatical construct not familiar to native English speakers, but are somewhat like prepositions. Particles are most commonly short words defined by the Japanese grammar that immediately follow the modified noun, verb, adjective or sentence. Particles perform grammatical functions, typically to indicate various meanings associated with the word, phrase or sentence that they immediately follow. For example, in the English sentence "John hit Bill.," the subject "John" is differentiated from the object "Bill" by word order. In the Japanese language, the subject-object order is not so important because particles make clear which is which. In modern Japanese language, the particle "ga" designates the subject and the particle "o" designates the object. Thus, the example sentence would read "John-ga Bill-o hit."

Figure 3B:
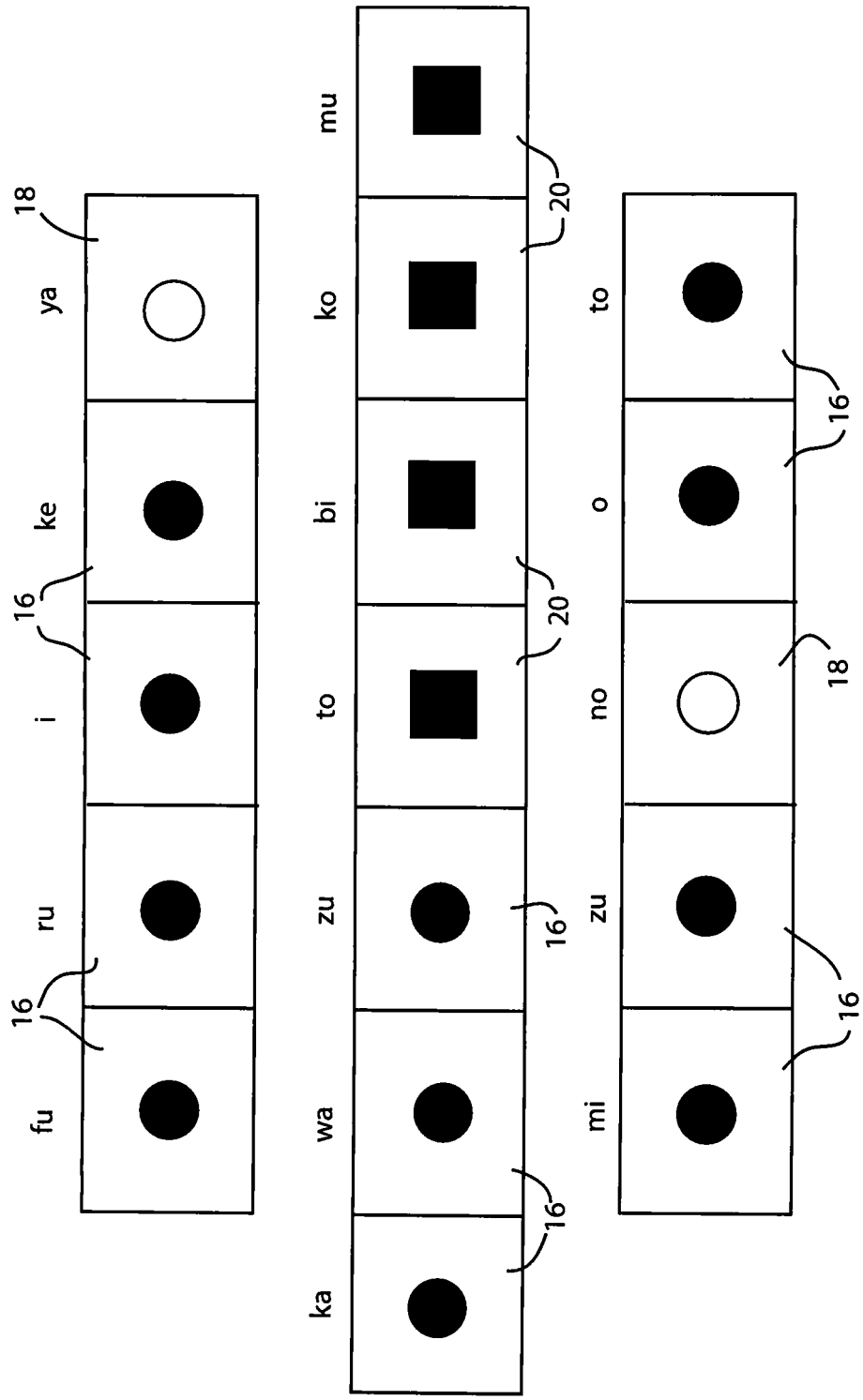
FIG. 3b is a plan view of the plurality of blocks of FIG. 1, using the visual representations from the chart of FIG. 3a to portray a grammar level representation of Basho's Frog Haiku (block facet or side 2)

FIG. 3b shows how the Basho Frog Haiku poem appears when visually portrayed at the grammar level. The poem begins with four blocks each representing one of the four syllables forming a non-inflected nominal (noun) 16, followed by a particle 18. The second row of the haiku then continues with three blocks forming another nominal 16, followed by four inflected verbals 20. The final row of the poem then concludes with two nominals 16, each consisting of two blocks, connected by a particle 18.

By studying the graphical representation provided by the block device representation system as shown in FIG. 3b, the student sees that the entire first line of the poem is dominated by non-inflected nominals, to which a particle is attached, indicating a functional end to the first phrase. The second line of the poem then continues with an additional nominal comprised of three syllables, but then abruptly shifts to an inflected verbal formed by four syllables. The student can thus appreciate that the second line of the poem makes an abrupt shift from nominal to verbal, thus highlighting the increased energy at the end of the second line of the poem. Studying the third line of the poem, the student sees that the structure reverts to a pair of nominals separated by a particle, thus illustrating the poem's coming to rest, or repose, following the action and energy of the second line.

Block Side 3—Functional Grammar (First Level)

Figure 4A:
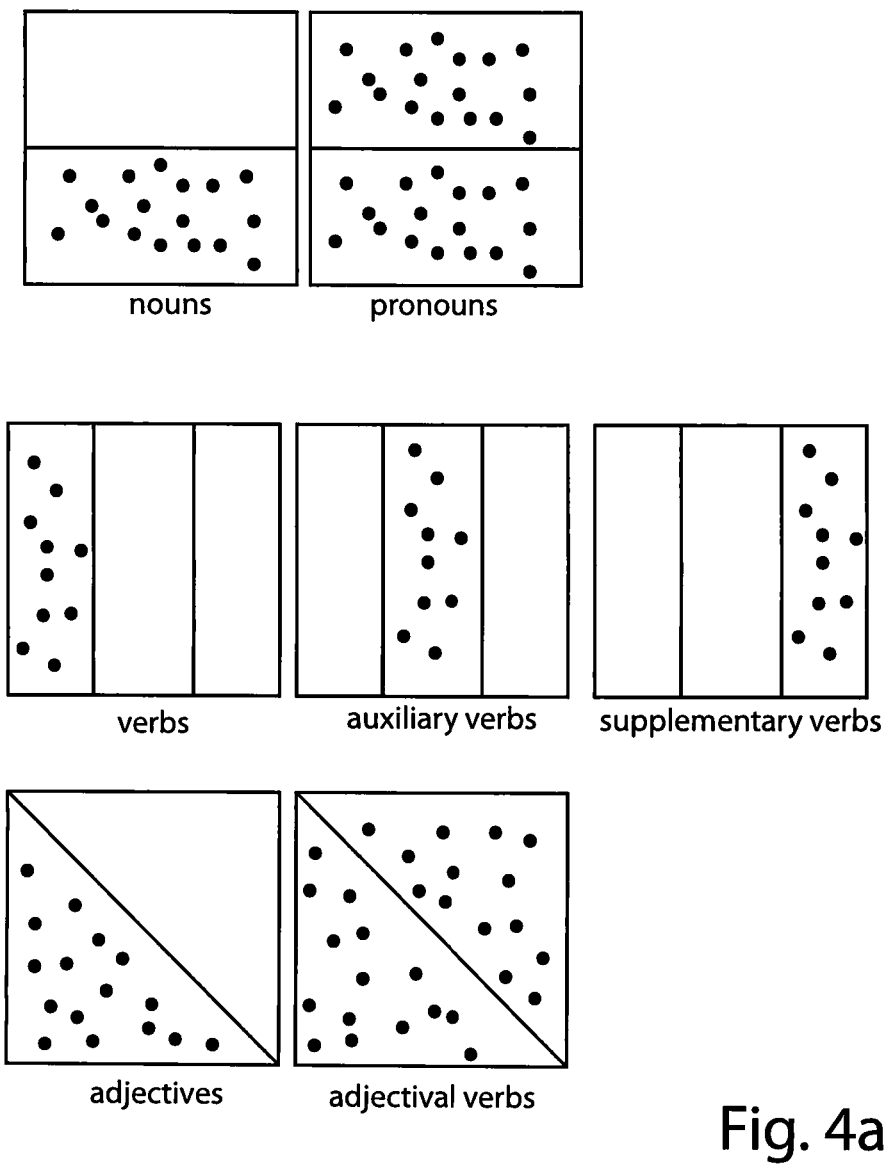
FIG. 4a is a chart showing how syllables of Japanese language may be visually portrayed to construct functional grammar level representations.
Figure 4B:
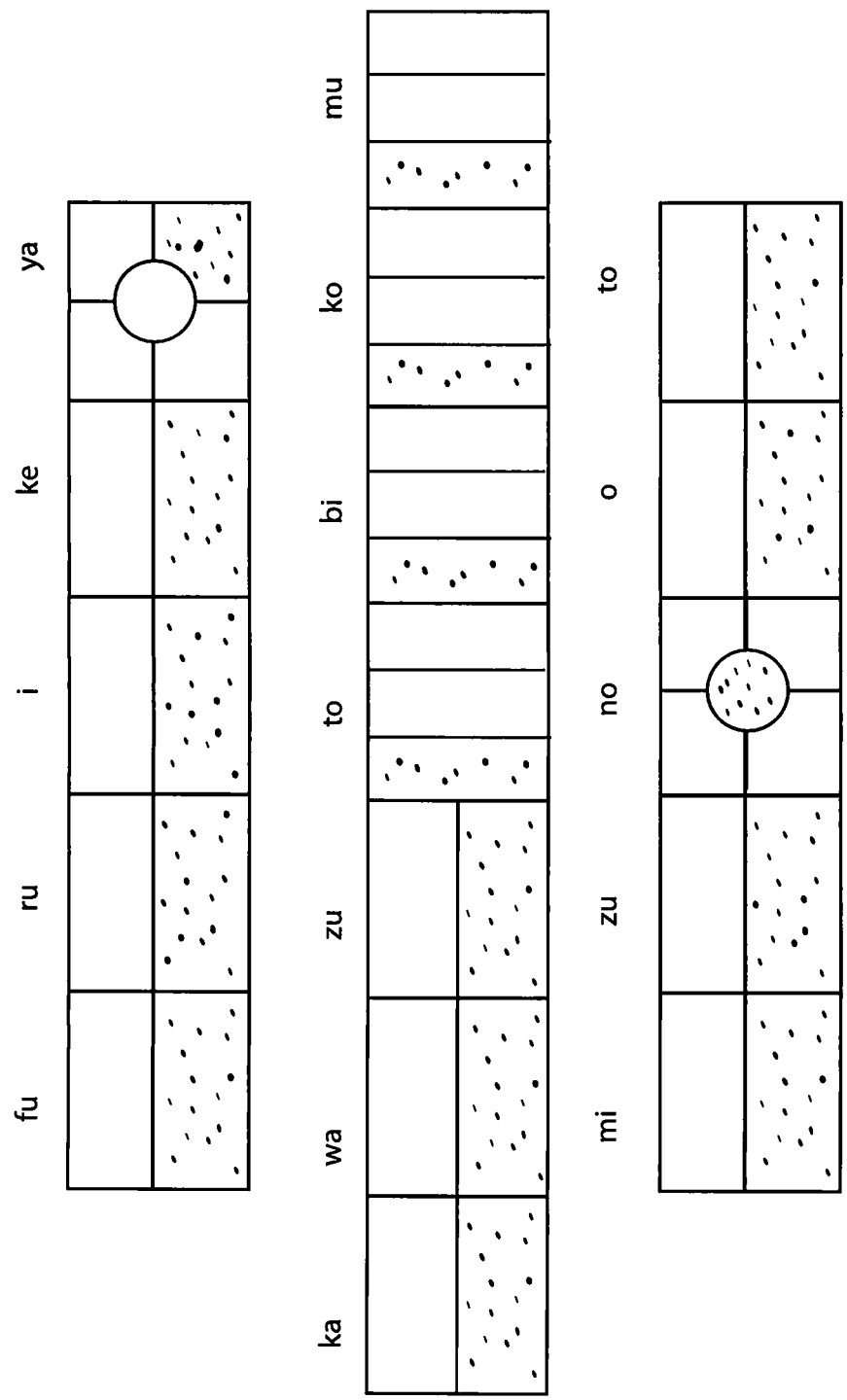
FIG. 4b is a plan view of the plurality of blocks of FIG. 1, using the visual representations from the chart of FIG. 4a to portray a functional grammar level representation of Basho's Frog Haiku (block facet or side 3)

FIGS. 3a and 3b have illustrated a high level grammatical analysis of the literary composition. It goes without saying, however, that the classical Japanese language is far more complex than has been represented in this high leer grammatical analysis. Digging more deeply into the grammar of the language, the literary composition can be analyzed as shown in FIGS. 4a and 4b to study functional grammar aspects of the language. As shown in FIG. 4a, nominals can be functionally categorized or grouped into nouns and pronouns. These are differentiated graphically, as illustrated, by different graphical symbols. Similarly, verbals can be categorized into three groups: verbs, auxiliary verbs and supplementary verbs. These are also differentiated by different graphical symbols. In a similar fashion, adjectivals can be categorized into two groups: adjectives and adjectival verbs. These are shown by different graphical symbols, as illustrated.

FIG. 4b shows how the Basho Frog Haiku would be represented using the functional grammar depicted in FIG. 4a.

Block Side 4—Functional Grammar (Second Level)

Figure 5A:
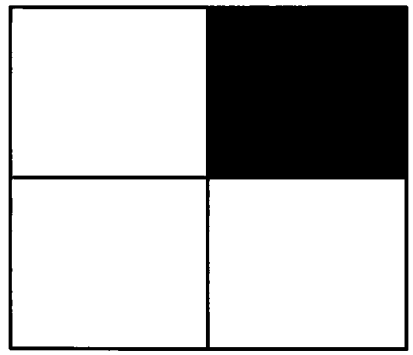
Figure 5A:
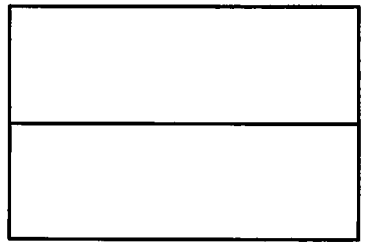

FIG. 5a shows how classical Japanese can be analyzed according to further functional grammar properties, at a somewhat higher level than was described by the functional grammar of block side 3 (FIGS. 4a and 4b). On block side 4, the nominal (nouns and pronouns) and verbals (verbs) are functionally analyzed to show:

1. For nouns—whether the noun is a proper noun (upper right corner shaded, as shown in FIG. 5a); a common noun (upper left shaded); a numerical noun (lower right shaded); or a nominal noun (lower left shaded). As shown in corresponding FIG. 5b, all of the nouns in the Basho Frog Haiku are common nouns. Thus all nouns in this haiku example have the upper right shaded.

2. For pronouns—personal pronouns have the upper half shaded; demonstrative pronouns have the lower half shaded. The Basho Frog Haiku uses no pronouns. Thus the pronoun structure is not used in FIG. 5b.

3. For verbals—regular verbs are depicted as shown in FIG. 5a using a® designation, whereas irregular verbs are given an/designation. In classical Japanese there are five types of regular verbs (kami 1, kami 2, fourth-grade, shimo 1 and shimo 2) and four types of irregular verbs (sa, ka, ra, and na). These are shown using the nine-cell chart shown in FIG. 5a, where shading is used to indicate the appropriate verb type. In FIG. 5a, the center cell has been shaded, indicating the verb type to be a fourth-grade regular verb. In this level of functional grammar analysis, transitive verbs are differentiated from intransitive verbs by adding a dot on the shaded cell. In the Basho Frog Haiku, as shown in FIG. 5b, the verb "tobikomu" is a fourth-grade, regular intransitive verb.

Block Side 5—Functional Grammar (Third Level)

Figure 6A:
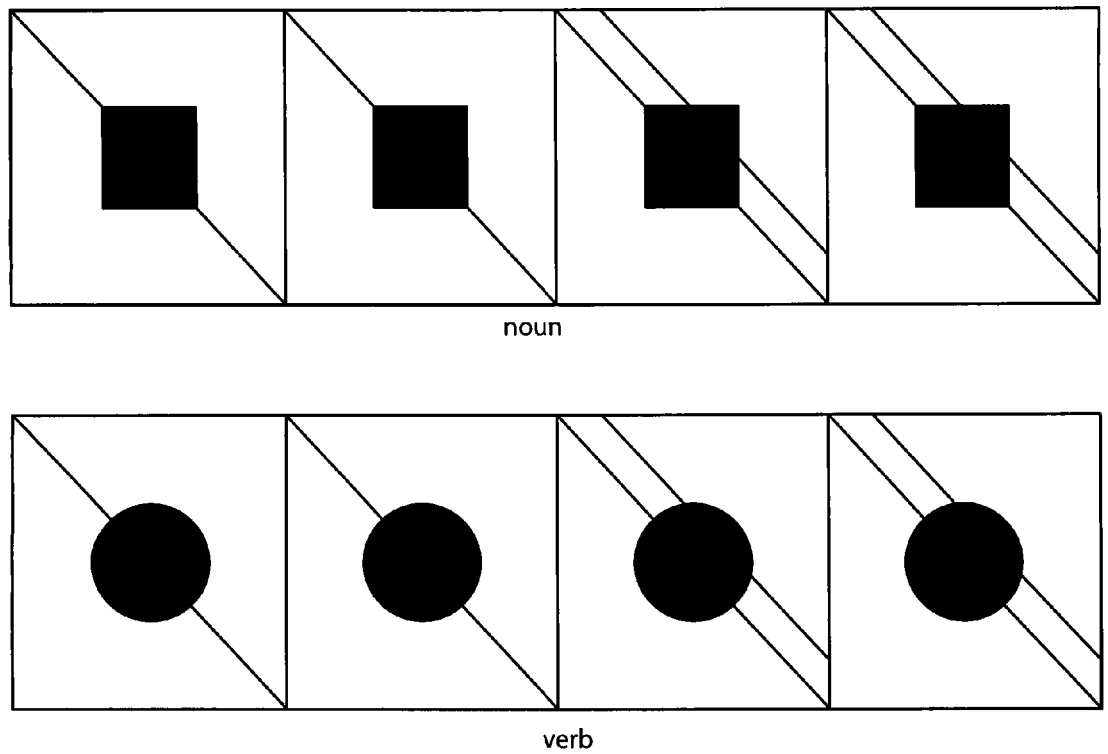
Figure 6B:
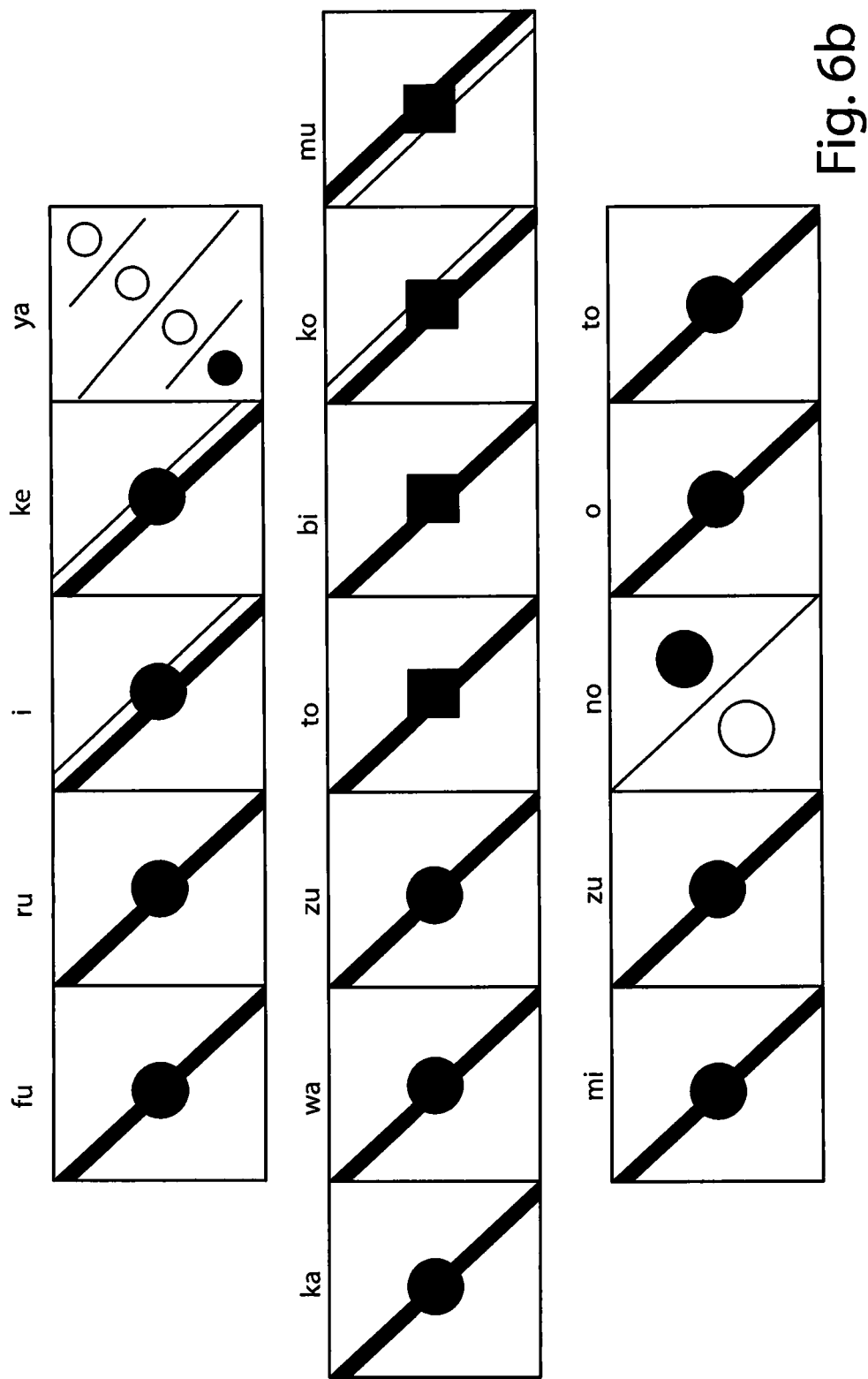
FIG. 6b is a plan view of the plurality of blocks of FIG. 1, using the visual representations from the chart of FIG. 6a to portray a functional grammar level representation of Basho's Frog Haiku (block facet or side 5)

Referring now to FIGS. 6a and 6b, the functional grammar can be analyzed at yet another level. These are represented using block side 5. On block side 5 the nominals (nouns) and verbals (verbs) are functionally analyzed to show:

1. For nouns—noun units are analyzed, showing when two nouns are linked. In classical Japanese, normally when two nouns are linked, they need a particle to join them. In the case of a noun unit, no linking particle is needed as this unit with different elements has become solidified as one noun. In the block side 5 representation, the first element of a noun unit is indicated by one diagonal line and the second element by two diagonal lines, as seen in FIG. 6a. In the Basho Frog Haiku, as shown in FIG. 6b, the noun unit, "furu+ike" in the first line of the haiku is equivalent to "an old pond" in English.

2. For verbs—verb units are analyzed, showing when two verbs are linked to form a verb unit. As shown in FIG. 6a, the first element of the verb unit is shown by one diagonal line and the second element by two diagonal lines. In the Basho Frog Haiku as shown in FIG. 6b, the verb unit "tobi+komu" is equivalent to "jump and plunge (into)" or more simply "dive."

Block Side 6—Functional Grammar (Fourth Level)

Figure 7A:
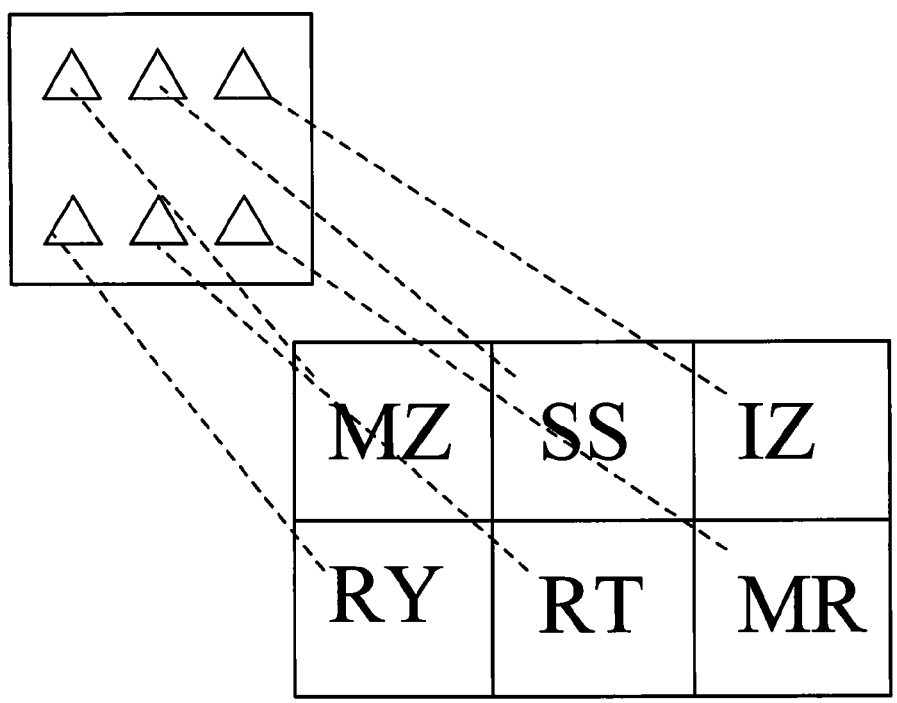
FIG. 7a illustrates how verb inflections are indicated in block side 6.
Figure 7B:
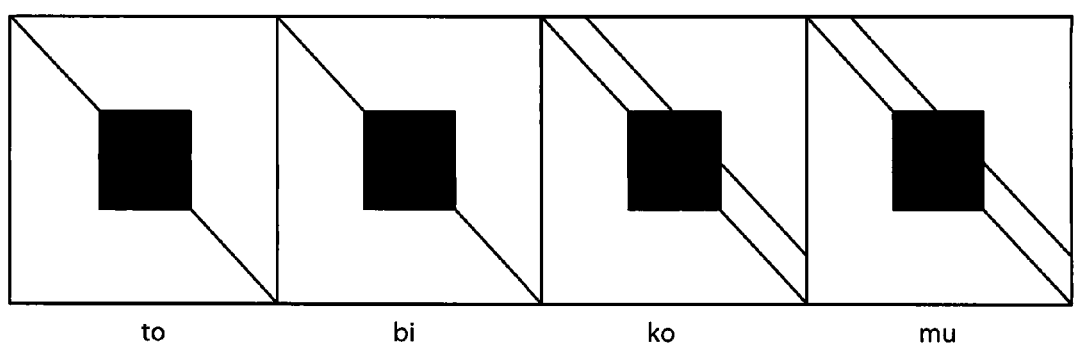
FIG. 7b is a plan view comparing the verb representation of "tobikomu" in respective sides 5 and 6, side 5 showing verb units and side 6 showing verb inflection.
Figure 7B:
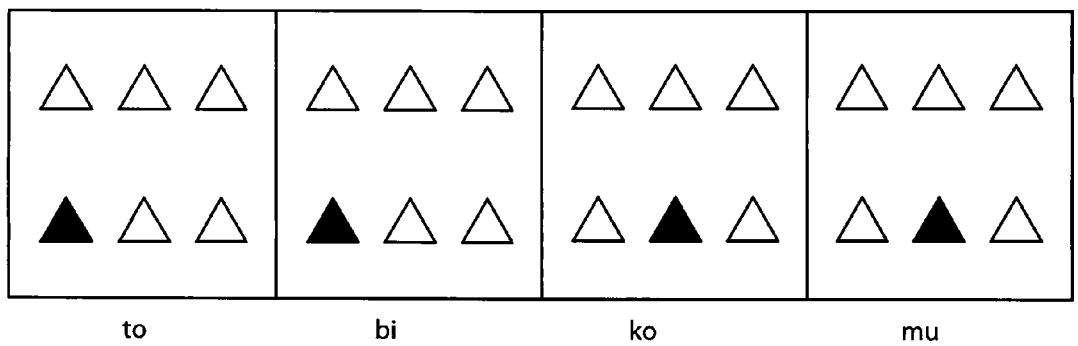
Figure 7C:
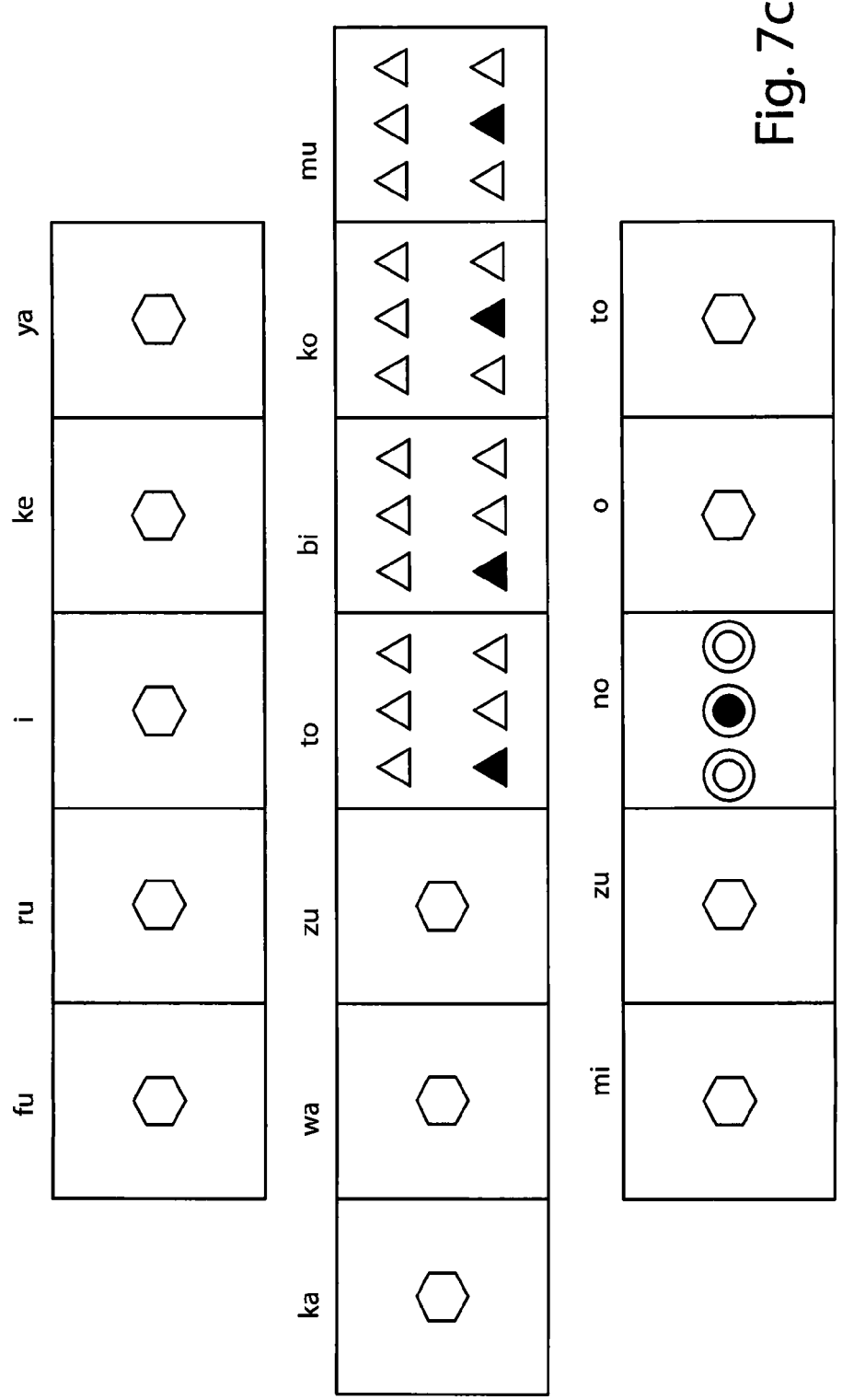
FIG. 7c is a plan view of the plurality of blocks of FIG. 1, using the visual representations from the chart of FIG. 7a to portray the functional grammar level representation of Basho's Frog Haiku (block facet or side 6)

Referring now to FIGS. 7a and 7b the functional grammar can be analyzed at yet another level. These are represented using block side 6. On block side 6 the nominals (nouns) and verbals (verbs) are functionally analyzed to show:

1. For nouns—classical Japanese uses noun modifiers such as pillow words, decorative words, fixed modifiers, etc. If desired, special graphical symbols (not shown in FIG. 7a) can be used to designate these. In the Basho Frog Haiku as shown in FIG. 7c, there are no noun modifiers. Thus a hexagon symbol has been used in FIG. 7c to denote the absence of such noun modifiers.

2. For verbs—in classical Japanese verbs are inflected. Six forms of inflection are depicted using six triangular shapes, with one being highlighted to show the designated inflection. As depicted in FIG. 7a, the six triangles correspond to the illustrated six forms of inflection: MZ, SS, IZ, RY, RT and MR. FIG. 7b compares the representation of the verb unit "tobikomu" for side 5 versus side 6. Note in side 6 that the first portion of the verb unit ends in the RY form (lower left triangle shaded) corresponding to the continuative form attached to the second part of the verb unit. The second portion of the verb unit ends in the RT form (lower middle triangle shaded) so that it can be attached to a noun (in this case "mizu" in the third line of the haiku). FIG. 7c shows the entire Basho Frog Haiku in the side 6 representation.

Particle Representations

Block Side 3

Figure 13A:
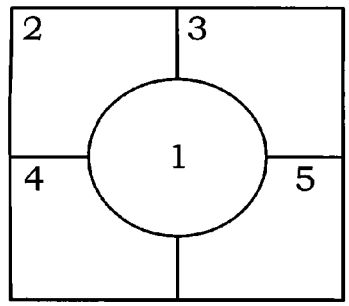
FIGS. 13a-13f (collectively FIG. 13) illustrate how particles are represented at different functional grammar levels in classical Japanese.

As illustrated diagrammatically in FIG. 13a, classical Japanese has five categories of particles from a functional grammar standpoint. These are depicted graphically on block side 3 by shading the pattern shown in FIG. 13a according to the following formula:

1. case particle—shade center circle as shown at 1;
2. conjunctive particle—shade upper left corner as shown at 2;
3. bound particle—shade upper right corner as shown at 3;
4. adverbial particle—shade lower left corner as shown at 4;
5. final & interjectory particle—shade lower right corner as shown at 5.

In the Basho Frog Haiku as shown in FIG. 4b (side 3) the "ya" particle is shaded as a final & interjectory particle and the "no" particle is shaded as a case particle, according to the rules of classical Japanese.

Block Side 4

Figure 13B:
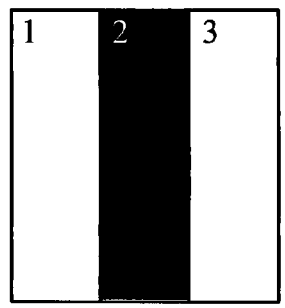
Figure 13C:
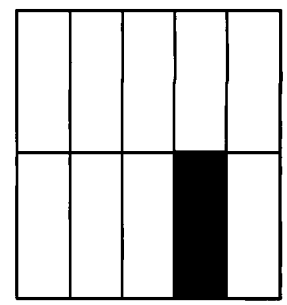
Figure 13:
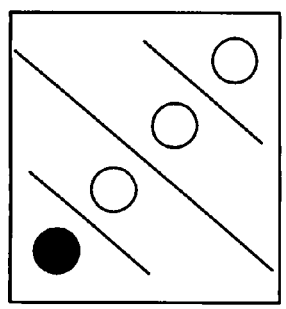
Figure 13:
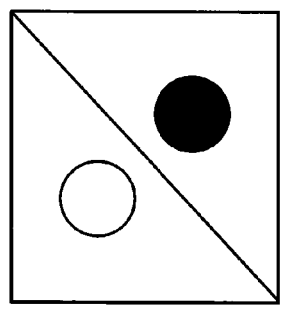
Figure 13:
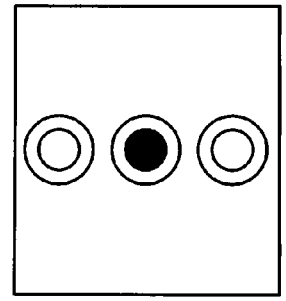

As illustrated in FIGS. 13b and 13c, particles can be represented according to further functional categories based on their membership in the five categories described above. For example, the final & interjectory particles can be further categorized, as shown in FIG. 13b as:

1. final—shade left third of rectangle as shown at 1;
2. interjectory—shade middle third of rectangle as at 2;
3. other—shade right third of rectangle as at 3.

Similarly, case particles can be further categorized according to ten different types, the case particle "ya" used in the Basho Frog Haiku is shaded as shown in FIG. 13*c*. For further information regarding the categories of case particles, reference may be had to the texts on classical Japanese. In this regard, the following are recommended:

Ikeda, Tadashi, "Classical Japanese Grammar Illustrated with Texts";

McCullough, Helen Craig, "Bungo Manual: Selected Reference Materials for Students of Classical Japanese";

Komai, Akira; Rohlich, Thomas H., "An Introduction to Classical Japanese";

Vovin, Alexander, "A Reference Grammar of Classical Japanese Prose";

Shirane, Haruo, "Classical Japanese: a Grammar";

Wixted, John Timothy, "A Handbook to Classical Japanese."

Block Side 5

Referring to FIGS. 13*d* and 13*e*, particles can be further functionally categorized, as exemplified by the following. The "ya" particle used in the Basho Frog Haiku can belong to one of the following four categories:

1. exclamation—shade lower left circle (as illustrated in FIG. 13*d*). This is the function of "ya" in the Basho Frog Haiku;
2. yobikake (calling out)—shade middle left circle;
3. kireji (a poetic device)—shade middle right circle;
4. other—shade upper right circle.

Similarly, the "no" particle used in the Basho Frog Haiku can belong to one of the following two categories:

1. subjective—shade lower left circle
2. attributive—shade upper right circle (as illustrated in FIG. 13*e*). This is the function of "no" in the Basho Frog Haiku.

Block Side 6

Referring to FIG. 13*f*, final and interjectory particles, for example, can be further functionally analyzed to indicate one of the following three categories:

1. location—shown by shading the left circle
2. quality or characteristics—shown by shading the center circle (as illustrated in FIG. 13*f*)
3. apposition—shown by shading the right circle.

In the Basho Frog Haiku, the interjectory particle "ya" has no further categorization. Thus the absence of functional marking in side 6 is shown by a hexagon to indicate that the functional designation at this level has been intentionally left blank.

Having now discussed how a language, such as in this case classical Japanese can be parsed and analyzed according to different sound, grammar and functional grammar levels, we turn now to a discussion of several physical and computer-implemented device embodiments that may be used to teach these concepts.

First—Physical Block Embodiment

Figure 8A:
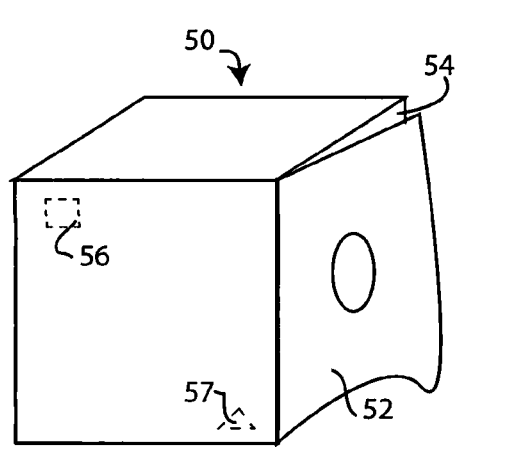
FIG. 8a is a detailed view of a block device with physical interface and replaceable panels.

Referring now to FIG. 8*a*, a first embodiment of block device is shown at 50. The illustrated block device is a six-sided cube, having interchangeable panels, such as panel 52, which the user can attach to the face or facet 54 of the block. The panels can be secured to the blocks by suitable reusable adhesive, by electrostatic or magnetic attraction or by using a mechanical attachment structure. The block device 50 can be provided with a physical interface structure to enforce linking rules among blocks. Thus, block device 50 has been illustrated to include interface lock and key structures, shown diagrammatically at 56 and 57. These structures are designed to meet with corresponding structures on adjacent blocks, thus enforcing linking rules between blocks. In order for two blocks to be placed side by side, the interface lock and key structures of the abutting faces of the respective blocks must match. In an alternate embodiment, magnets disposed within the interior of the block device 50, at designated locations, enforce linking rules between blocks through magnetic attraction and repulsion.

Second—Physical Block Embodiment

Figure 8B:
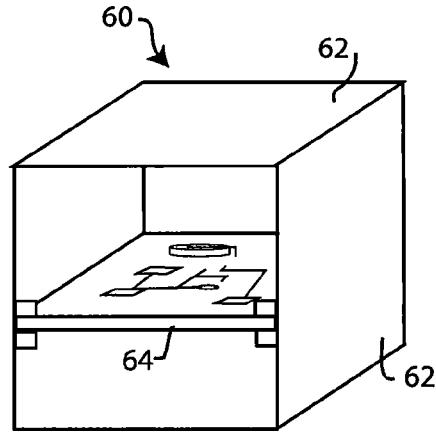
FIG. 8b is a detailed view of an electronic block device, with the display panel of one facet removed to reveal the internal electronic components.

An alternate block device shown in FIG. 8*b* takes the form of an electronically configurable block device 60. Device 60 has electronic display panels 62 on each of its six sides. For purposes of illustrating the interior of block device 60, the front-facing display panel has been removed in FIG. 8*b*. Mounted within the block device 60 is a circuit board 64 that carries the electronic circuitry used to produce the appropriate graphical images on the six display panels and also to enforce linking rules among blocks. If desired, the block device 60 can also include a sound generator, allowing the block to emit a sound corresponding to the sound of the language as programmed for that block. The sound generator may also be used to alert the user when placement of two blocks adjacent to one another violates linking rules. The alert could come in the form of an audible beep, signifying a linking rule violation. Alternatively, one or more of the display panels can be altered in appearance, such as by flashing the display on and off to signify a linking rule violation between blocks.

Figure 9:
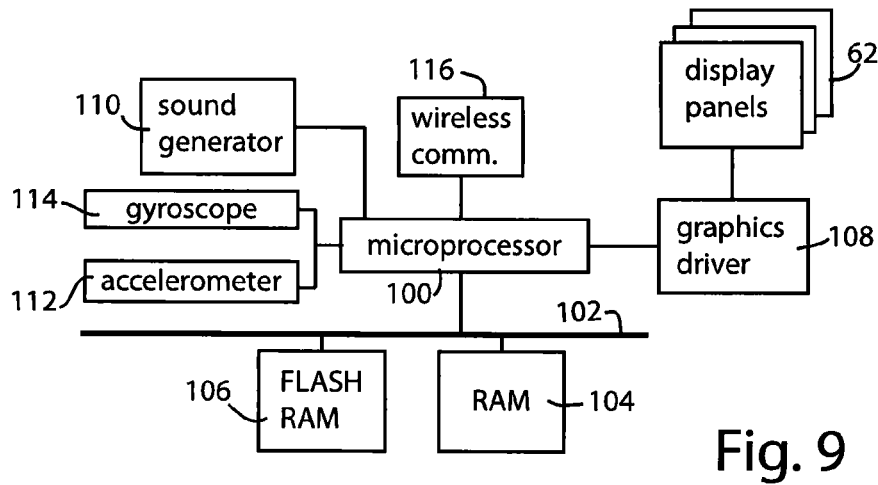
FIG. 9 is an electronic circuit diagram of an electronic block device.

A suitable electronic circuit for implementing the electronic block embodiment of FIG. 8*b* is shown in FIG. 9. A microprocessor or microcontroller 100, coupled to data bus 102 communicates with the associated random access memory (RAM) 104 and flash memory 106. Random access memory 104 stores the operating instructions used by microprocessor 100 to perform the display and linking rules enforcement functions. The random access memory 104 also stores data used in these display and linking rules operations, such as data indicative of the text of the literary composition being studied, and also data indicating which syllable within the target language the particular block has been assigned. The microprocessor is then programmed to select the individual graphical display artwork for presentation on each of the display panels 62. Preferably, the microprocessor interfaces with the display panels through a graphics driver circuit 108 that multiplexes the output of microprocessor 100 to each of the display panels 62, in a consecutive fashion so that each panel receives the appropriate graphical display information for that block's current assignment.

The flash RAM 106 may be used to store underlying information about the target language, as needed by the microprocessor to determine which sound level, grammar level and functional grammar level displays need to be generated. In this regard, the flash memory 106 may store a dictionary of words in the target language, such dictionary providing grammatical information from which the microprocessor can determine grammatical constructs such as parts of speech needed to generate the grammar level displays.

If implemented, the microprocessor 100 also communicates with a sound generator circuit 110 that is capable of reproducing sounds of the target language through suitable digital-to-analog converter, amplifier and speaker components (not shown). The language sounds associated with each syllable of a word found within the dictionary stored in flash memory 106 can also be stored in this dictionary as digital samples of the respective sounds. Thus, microprocessor 100 is programmed to retrieve the appropriate sound and play it through the sound generator 110 at the appropriate time, such as when the user taps on the face of the block, lifts or shakes the block or otherwise performs a gesture that can be sensed. The microprocessor 100 is coupled to an accelerometer 112 which senses movement of the block and is thus capable of detecting when the user taps on, lifts, shakes or otherwise supplies a gesture that the microprocessor interprets as a request to enunciate a sound. Microprocessor 100 may also be coupled to a gyroscope 114, allowing the microprocessor to know how the block is oriented in space. This information is useful, for example, to determine how the blocks are oriented and specifically which of the six display panels is facing up.

Figure 10:
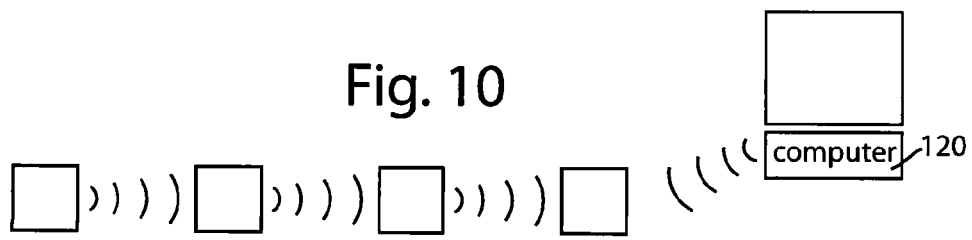
FIG. 10 illustrates a wireless communication embodiment of individual blocks in peer-to-peer communication as well as in optional communication with a central computer.

In the electronic block embodiment of FIG. 8*b*, all of the blocks used by the language teaching system can be provided with microprocessor or microcontroller functionality. If desired, the individual blocks can communicate with one another or with a separate computer, as illustrated in FIG. 10. Thus, the circuitry of FIG. 9 may include a wireless communication circuit 116 to support this functionality.

Inter-block communication via wireless technology offers the advantage of allowing each of the blocks to communication with the other blocks through a peer-to-peer negotiation. Such peer-to-peer communication allows the blocks to mutually enforce linking rules and also to discover and apply higher level functional grammar rules, as needed, depending on the literary composition being studied. Communication with an external computer, such as computer 120, allows some, or all, of the computational burden to be borne by the computer 120. Such a configuration makes it possible, for example, to readily change the target language by simply selecting different data files and grammatical rules using computer 120 and then distributing that information to the respective blocks. In such case, the flash memory 106 (FIG. 9) for each block may be updated to correspond to the target language selected via computer 120. Computer 120 may also be used to receive human input regarding the literary composition being studied. The teacher or student may simply type the literary composition into computer 120 (or download it from the internet) and computer 120 then propagates this information to the blocks so that each block assumes its individual role in representing the composition.

Figure 11:
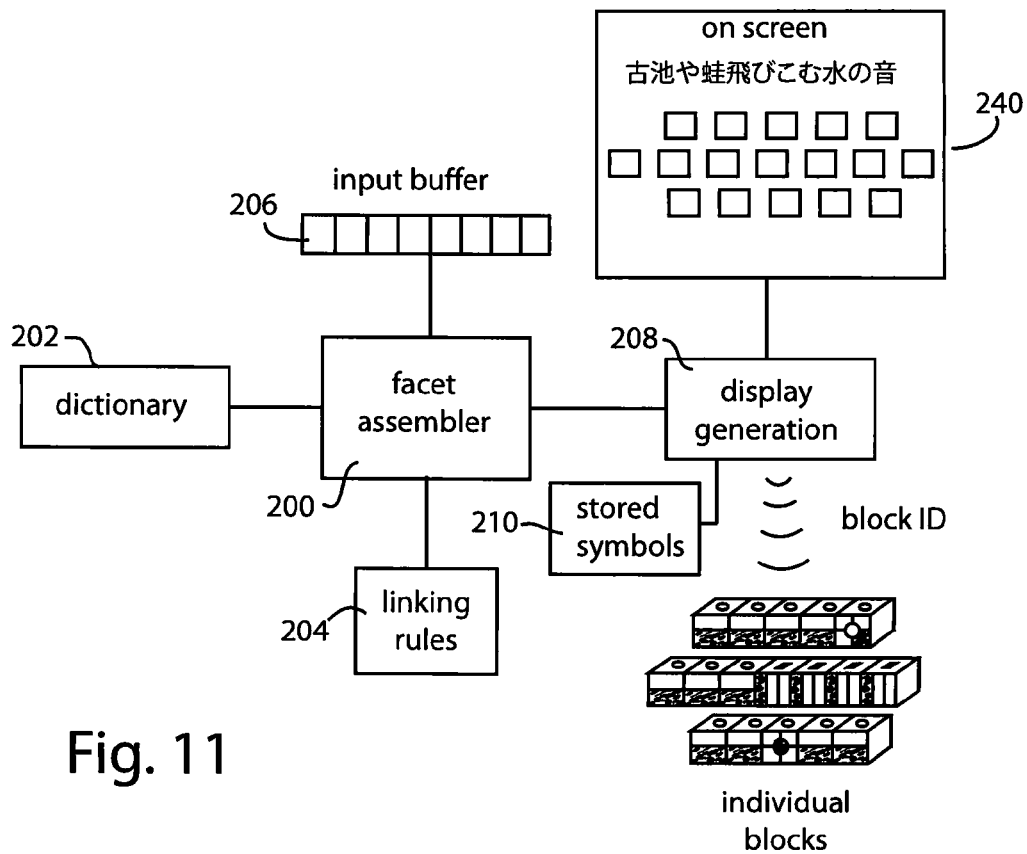
FIG. 11 is a functional block diagram illustrating how the microprocessor or microcontroller is configured to implement the systems and methods disclosed, illustrating both embodiments where individual electronically controlled blocks are configured and where the blocks are graphically depicted in an on screen display.

To more fully appreciate how the microprocessor 106 functions to generate the display panels, refer to FIG. 11. FIG. 11 shows in functional block diagram form what the microprocessor 100 for each block will perform. The microprocessor is programmed to include a facet assembler 200 that has access to the dictionary 202 containing all words of the target language that the language teaching system is able to parse and understand. This dictionary stores information including what sounds correspond to the syllables making up each word, the grammatical context or part of speech attributed to that word, and other grammatical information. The facet assembler also has access to a set of stored linking rules 204 that state in deterministic fashion all of the functional grammar rules used by the target language. The facet assembler further has access to an input buffer 206 into which is stored the text of the composition being studied. The facet assembler then controls the display generation function 208, which selects from a group of stored symbols 210, the appropriate symbols to populate each facet of each block.

In the electronic block embodiment of FIG. 8*b*, physical individual blocks, with the electronic display panels are supplied information from the display generation function 208. Each block in the sequence comprising the literary composition is assigned a unique block ID and the display generation function broadcasts block ID and individual block display panel artwork for all of the blocks. Each individual block then ascertains its block ID by inference after communicating with adjacent neighbors. Once each block ascertains its block ID, or position within the physically arranged composition of blocks, the block then stores the display artwork corresponding to its block ID in the random access memory 104 associated with its microprocessor 100. If desired, the individual blocks can implement a mesh network, such as a ZigBee network whereby the individual blocks are able to share information with one another, with the goal that all blocks learn their respective roles, based upon the particular composition being studied, and display the appropriate graphical images on the respective facets.

Third—Virtual Block Embodiment

While the physical three-dimensional block embodiment offers many advantages, there are situations where use of physical blocks is not convenient. Thus, the electronic block device representation system can also be implemented using an on-screen display whereby the blocks are computer-generated images to resemble three-dimensional block-like devices. This alternate embodiment has been illustrated at 240 wherein a screen is depicted having a collection of block devices as computer-generated images. The on-screen display can also include the text being studied, if desired. For illustration purposes here, the on-screen display includes the Basho Frog Haiku poem expressed in its kanji form.

Fourth—Multiplayer Game Embodiment

Figure 12:
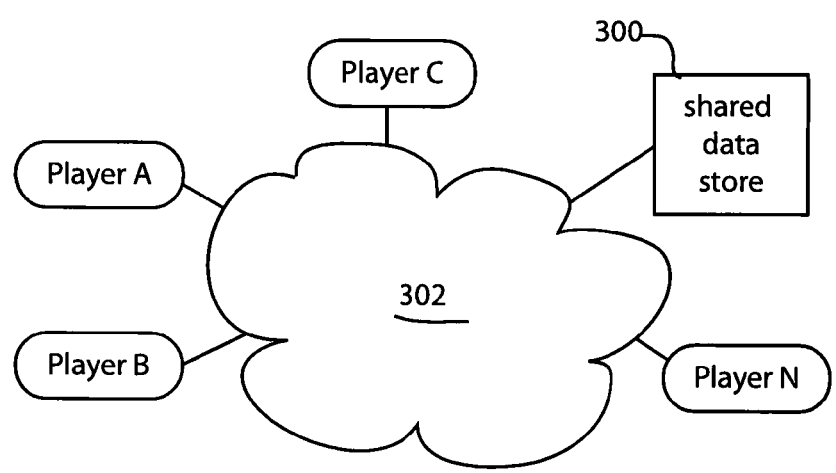
FIG. 12 is a computer system diagram illustrating how the disclosed system and method may be incorporated into an interactive game.

In the embodiments discussed so far, the individual blocks of the block device representation system are arranged so that a single student or group of students viewing the same set of blocks can learn different linguistic levels of the target language. In the alternate embodiment illustrated in FIG. 12, individual learners can be players in an online game, where the state of the composition being studied and the individual blocks comprising that study may be stored in a shared data store 300 that is accessible to all players over the internet 302. As will be discussed next, the players can each assume different roles, corresponding to different levels of expertise regarding the target language and its literature. In such role player division of labor, beginning players might be responsible, for example, simply to identify the sounds used in a composition, leaving the higher level grammatical parsing functions to more skilled players. The role playing game is made possible because the shared data store is essentially configured as previously described in connection with FIGS. 9 and 11 and is thus able to parse a given text and assign the appropriate display information to the plural facets of the blocks. Each player would then see a computer-generated display image of the blocks being mutually configured by all of the players. If desired, a player could also use a set of physical, three-dimensional electronic blocks that communicate with a computer (such as computer 120 of FIG. 10) and then use those blocks as the display for the multi-player game being worked by all players.

The invention claimed is:

1. A method of teaching a language through literature study comprising the steps of:

furnishing a composition selected from the literature in the target language being taught, parsing the composition into plural different linguistic component levels, the levels including a sound level, a grammar level and at least one functional grammar level;

providing an electronically configurable block system comprising a plurality of electronically intercommunicating physical blocks providing an electronic display that presents an electronically generated image representing a first facet, a second facet and a third facet applying a predefined set of sound rules according to the target language to generate and display on said first facet a first visual representation that maps the parsed sound level of the composition to a first sequence of individual graphical symbols selected from a first group of symbols representing the sounds employed by the target language, the number of individual graphical symbols of said first sequence corresponding to the number of individual parsed sounds in the composition;

applying a predefined set of grammar rules according to the target language to generate and display on said second facet a second visual representation that maps the parsed grammar level of the composition to a second sequence of graphical symbols selected from a second group of symbols representing the grammatical parts of speech employed by the target language;

applying a predefined set of functional grammar rules according to the target language to generate and display on said third facet a third visual representation that maps the parsed functional grammar level of the composition to a third sequence of graphical symbols selected from a third group of symbols representing the function of grammatical structures employed by the target language being taught;

using said electronically configurable block system to define plural n-sided blocks, each block having plural facets onto which the first, second and third visual representations may be applied;

selecting a number of said blocks equal in number to the number of individual parsed sounds in the composition and applying said first sequence of individual graphical symbols to first facets of said number of blocks and aligning the blocks to maintain the order of first sequence;

while retaining the alignment of said number of blocks, applying said second sequence of graphical symbols to second facets of said number of blocks;

while retaining the alignment of said number of blocks, applying said third sequence of graphical symbols to third facets of said number of blocks;

selectively viewing the first, second and third facets of said number of blocks to visualize how the target language functions to express the composition with respect to way the sounds, grammar and functional grammar are used.

2. The method of claim 1 wherein the blocks each have a set of interfaces that enforce rules by which a first block may be sequentially associated with a second block.

3. The method of claim 1 wherein the plural blocks are tangible, three-dimensional structures having facets comprising regular polygons.

4. The method of claim 1 wherein the plural blocks are three-dimensional cubes.

5. The method of claim 1 wherein said device is a set of individual three-dimensional structures having facets comprising regular polygons.

6. The method of claim 1 wherein said device includes an electronic display and wherein the blocks are computer-generated representations of three-dimensional structures having facets comprising regular polygons.

7. The method of claim 1 further comprising using a computer to perform the step of parsing the composition.

8. The method of claim 1 further comprising using a computer to generate at least one of said first, second and third visual representations.

9. The method of claim 1 further comprising using a computer to apply at least one of said first, second and third sequences of graphical symbols to the facets of said number of blocks.

10. An apparatus for teaching a target language through literature study comprising, a device defining plural electronically configurable blocks, each block having plural electronically configurable display facets onto which different visual representations may be applied;

a first collection of panels each displaying a graphical symbol selected from a first set of individual graphical symbols each corresponding to a different sound defined by the target language a second collection of panels each displaying a graphical symbol selected from a second set of individual graphical symbols each corresponding to a different grammatical unit defined by the target language;

a third collection of panels each displaying a graphical symbol selected from a third set of individual graphical symbols each corresponding to a different grammatical functions defined by the target language;

the blocks each having a first facet that supports one of said first collection of panels, having a second facet that supports one of said second collection of panels and having a third facet that supports one of said third collection of panels;

the blocks being positioned such that the first facet of each block are coplanar, the second facet of each block are coplanar and the third facet of each block are coplanar;

the blocks being sequentially arranged such that:

(a) the first facets display graphical symbols representing a sequence of sounds according to a composition selected from the literature in the target language, (b) the second facets display graphical symbols representing a sequence of grammatical units according to a composition selected from the literature in the target language, and (c) the third facets display graphical symbols representing a sequence of grammatical functions according to a composition selected from the literature in the target language.

11. The apparatus of claim 10 wherein the blocks each have a set of interfaces that enforce rules by which a first block may be sequentially associated with a second block.

12. The apparatus of claim 10 wherein the plural blocks are tangible, three-dimensional structures having facets comprising regular polygons.

13. The apparatus of claim 10 wherein the plural blocks are three-dimensional cubes.

14. The apparatus of claim 10 wherein said device is a set of individual three-dimensional structures having facets comprising regular polygons.

15. The apparatus of claim 10 wherein said device includes an electronic display and wherein the blocks are computer-generated representations of three-dimensional structures having facets comprising regular polygons.

16. The apparatus of claim 10 further a computer programmed to parse the composition.

17. The apparatus of claim 10 further comprising a computer programmed to generate at least one of said first, second and third visual representations.

18. The apparatus of claim 10 further comprising a computer programmed to apply at least one of said first, second and third sequences of graphical symbols to the facets of said number of blocks.

* * * * *